Patented May 28, 1935

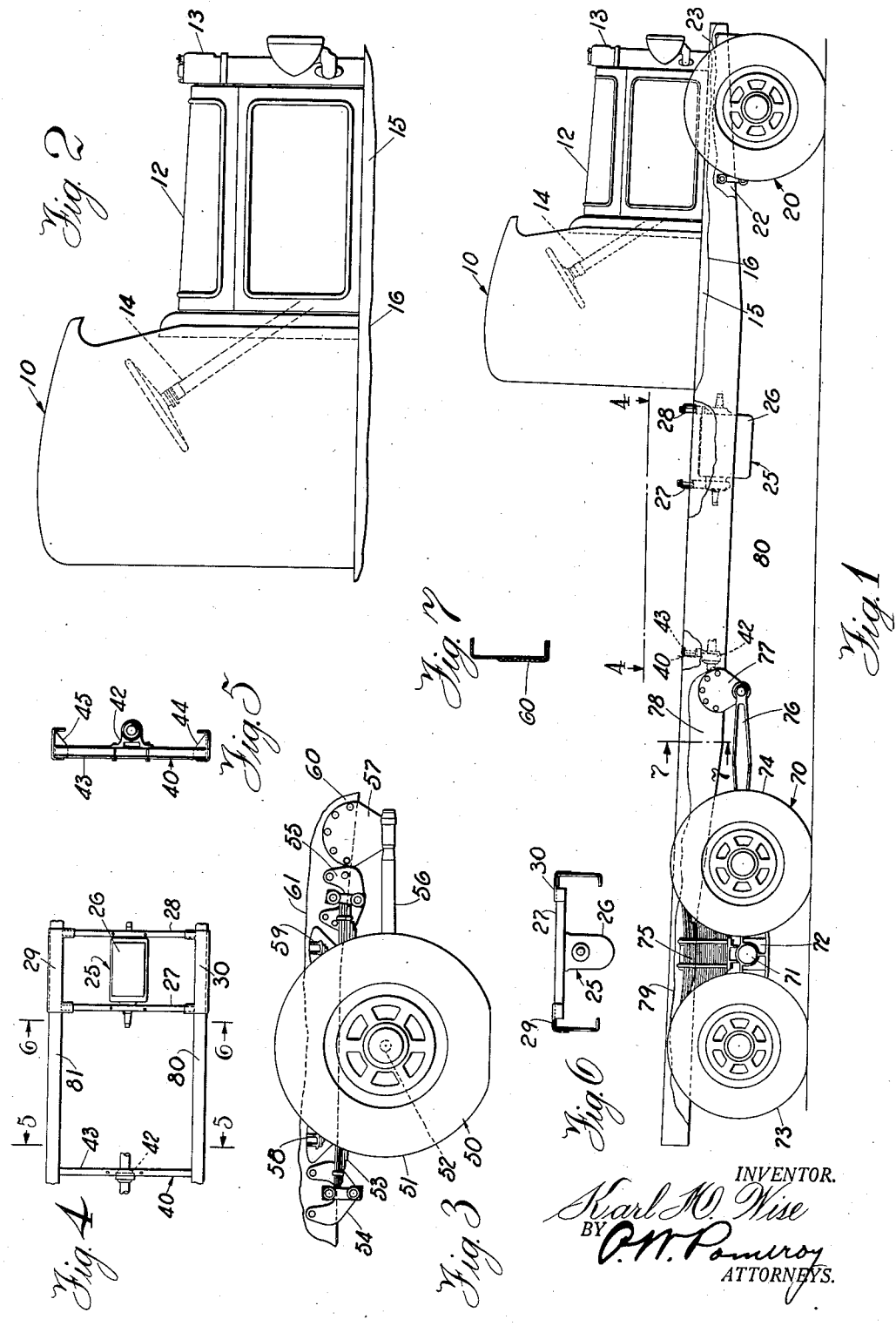

2,003,164

UNITED STATES PATENT OFFICE 2,003,164

MOTOR VEHICLE

Karl M. Wise, Buffalo, N. Y., assignor to The White Motor Company, Cleveland, Ohio, a corporation of Ohio Application October 24, 1931, Serial No. 570,873

4 Claims. (Cl. 180—1)

This invention relates to a method of building motor vehicles and particularly to a method of building motor trucks, and has for its principal object the provision of a method whereby motor trucks may be quickly and easily built to meet a wide variety of different service requirements.

A further object is the provision of a method for building motor trucks whereby certain parts of the truck may be built as standard units and other portions built as custom or variable units, and the different portions then assembled in various combinations to meet the special service requirements of each individual truck.

A still further object is the provision of a method of building motor trucks whereby certain portions of the truck built up as standard units may be welded to another or other portions of the truck built up as custom or variable units to form a completed truck particularly adapted for certain specific service conditions.

It is also an object to provide a method as described above whereby a motor truck may be quickly and economically built up to meet certain specific service requirements and wherein the truck so built up will be strong and durable as well as being especially adapted for its particular duty.

Other objects and advantages will appear as the description proceeds.

The drawing illustrates one manner in which the method, which is the subject matter of this invention, may be applied. The drawing, however, is to be taken as illustrative only and not as limiting the invention, the scope of which is to be measured entirely by the scope of the subjoined claims.

In the drawing:

Figure 1 is a vertical elevational view of a truck built up according to the method of this invention.

Figure 2 is an elevational view of one of the standard units forming a part of this invention.

Figure 3 is an elevational view of another of the standard units forming a part of this invention.

Figure 4 is a fragmentary plan view of a portion of the chassis indicated by the line 4—4 of Figure 1.

Figure 5 is a cross sectional view on the line 5—5 of Figure 4.

Figure 6 is a cross sectional view on the line 6—6 of Figure 4, and

Figure 7 is a cross sectonal view on the line 7—7 of Figure 1.

Until the present time, whenever a customer has ordered a truck for a special purpose, it has generally been necessary to build a complete truck to meet the particular service requirements. This of course, necessitates a material expense in building the truck as well as considerable delay in its delivery. This condition has been particularly prevalent in the case of heavy duty trucks. In the case of light trucks and speed wagons, a customer is usually able to adapt a standard model truck to his needs without any serious inconvenience, but in the case of heavy duty trucks, it is practically necessary to build a special truck for each particular job. This has led to a manufacturing condition wherein practically all heavy duty trucks are substantially custom built.

However, as stated above, this practice of supplying custom built trucks for every order for heavy duty trucks is slow and expensive, costing the customer more money and at the same time delaying the time at which he can start using the truck. It is the object of this invention to obviate this condition by making it possible to build special trucks on a production basis, thereby lowering the cost and also greatly lessening the time required for delivery of the truck.

This is accomplished by building up component parts of the truck such as the cab, engine, steering gear and associated parts, the front axle and wheel assembly, the transmission, the rear axle, wheels, spring and differential assembly, the propeller shaft and the propeller shaft supports all as separate standard units for all the different models of trucks produced by the manufacturer. These standard units may be built on a production basis and stored against future demand.

The truck chassis frame itself, however, is not manufactured until the customer's order setting forth the requirements to be met is received. When the information has been obtained, it is comparatively easy to design and manufacture a chassis frame to meet the particular requirements set forth. Once the chassis frame has been made, it is then a simple matter to select suitable standard units out of stock and assemble them to the special size frame to provide a truck having the exact specifications required by the customer.

Referring to the drawing in detail, the numeral 10 generally indicates a truck cab, the numeral 12 a motor hood, the numeral 13 a radiator and head lamp assembly, and the numeral 14 the steering apparatus.

As particularly illustrated in Figure 2, it will be seen that these component parts are mounted upon a pair of members, one of which is indicated at 15. These members have straight top surfaces to which the parts are welded and have a broken-away depending portion indicated by the line 16. The members 15 are so spaced that the assembled unit may be placed upon the top of a truck frame and the members 15 welded thereto to secure the unit in place upon the frame.

The numeral 20 generally indicates a front axle and wheel assembly including the axle, wheels, springs, steering knuckles and other necessary parts, the springs being secured by shackles to members 22 having a straight bottom surface and a broken-away portion indicated by the line 23, the parts 22 being so spaced that the frame may be mounted thereon and the parts then welded to the frame to rigidly secure the front end assembly unit in place.

The numeral 25 generally indicates a transmission assembly which comprises a transmission housing 26 supported by cross members 27 and 28 secured at their ends to members 29 and 30 which are so spaced as to rest upon the side members of the main vehicle frame and are adapted to be welded to the vehicle frame to rigidly secure the transmission assembly in place.

The numeral 40 generally indicates a transmission shaft support assembly illustrated in detail in Figure 5. This unit includes a bearing hanger 42 for the transmission shaft secured to a cross member 43 having terminal members 44 and 45 at the ends thereof, the terminal members 44 and 45 being so spaced that they fit within the channels of the main vehicle frame and may be welded thereto to secure the units 40 in place.

Referring to Figure 3, the numeral 50 generally indicates a rear axle differential and wheel assembly which includes the wheels 51, axle 52, the differential, not shown, springs 53, spring shackles 54 and 55, radius rod 56, radius rod support 57, and spring stops 58 and 59. This complete assembly is mounted on a member 60 having a straight bottom surface and a broken-away portion shown by the line 61. The members 60 are so spaced that the frame may be placed thereon and the members then welded to the frame to rigidly secure the assembled unit 50 in place on the frame, the manner of mounting the frame on the members 60 being illustrated in section in Figure 7.

In Figure 1, there is illustrated a different rear end assembly generally indicated by 70 which is of the type commonly known as a four-wheel truck unit, the rear axle 71 being mounted on a support 72 extending between two pairs of rear wheels 73 and 74. This assembly is provided with differential units, not shown, and with a spring 75, radius rod 76 and radius rod support 77. This unit is mounted on members 78 having straight bottom surfaces and a portion broken-away as illustrated by the line 79. The frame is mounted upon the members 78 and secured thereto by welding as explained in the description of the unit 50.

The frame itself comprises a pair of lateral members 80 and 81 secured together by suitable cross members in the usual manner. This frame is substantially conventional in construction except that it may be made in many different dimensions as to length and depth to provide suitable frames for every condition of service.

The standard units are also to be provided in several different dimensions, thus there may be three different engine sizes requiring three standard cab and engine assemblies. If, as indicated there are three different engine sizes, there will probably be four different front assembly sizes, one for each engine size and one carrying an extra heavy front axle for use in what is commonly called "mucking", wherein the front axle may be required to withstand the strain of moving other trucks, or a steam shovel, or other pieces of equipment. Also a truck provided with an extra heavy front axle as indicated may be fitted with a hoist, shovel or snow plow. If there are three engine sizes there probably will not be more than three rear wheel units, two-wheel units for the two small engine sizes and a four-wheel unit for the large engine size. However, it is quite possible that it may be desirable to use a four-wheel unit with a medium size engine, and in the flexible method of building up the truck which forms the subject matter of this invention, it is quite possible to supply a four-wheel rear wheel unit with a medium or light engine. Also with three engine sizes, there may be as many as six or eight different transmission units depending upon the service of the truck. That is, whether the truck is to be used in high speed work on hard smooth roads, whether it is to be used on soft ground around excavations, whether it is to be used as a complete unit, or used to haul trailers and many other possible variations in the conditions of service. Which ever one of the various transmission units is best adapted to use for the condition of service for which a particular truck is designed, may be readily included in the make up of the truck.

Also it is easy to include the proper number of transmission shaft supports depending upon the length of the truck frame, it being only necessary to place these standard supports in the frame and weld them thereto. It is to be noted that the length and depth of the frame itself are variable to meet any particular service requirement and that any particular frame may have the sizes of standard assembly units mounted thereto which are best adapted to fulfill the particular service requirements of the truck.

It is therefore apparent that by this method it is a simple matter to build up a truck especially adapted for the particular service for which the customer desires to use it and that such a truck can be produced quickly and economically by employing the method described above which forms the subject matter of this invention.

Having now described my invention and the principal objects and advantages thereof so that others skilled in the art may clearly understand the same, what I desire to secure by Letters Patent is as follows:

1. The method of manufacturing a motor truck which comprises, mounting the engine, radiator and cab upon longitudinally disposed angle irons spaced apart a distance substantially equal to the width of a standard truck frame to form an integral unit, mounting a front axle and steering gear upon longitudinally disposed angle irons to form a second unit, mounting a transmission mechanism on cross members connected at their ends to longitudinally disposed angle irons to form a third unit, mounting a rear axle and differential mechanism upon longitudinally disposed angle irons to form still another unit, and assembling said units together to form a complete vehicle by placing said angle irons on the side members of a vehicle frame and welding said angle irons and frame members together.

2. The method of manufacturing standard motor trucks to meet individual requirements which comprises, providing a series of standard engines of different power capacities, providing a series of standard rear axles of different traction characteristics and load carrying capacities, providing a series of standard front axles of different load carrying capacities and of different degrees of rigidity, mounting an engine together with a suitable cab upon a cut away portion of a vehicle frame, mounting a front axle upon a cut away portion of a vehicle frame, mounting a rear axle upon a cut away portion of frame, providing a series of standard frames of different lengths and load carrying capacities having portions cut away therefrom, selecting a unit from each of the above groups such that when combined the units will provide a truck having the desired characteristics, and assembling said units together in their proper relation by welding said cut away frame portions on which the engine and axles are mounted to the frame to fill in the portions cut out of said frame.

3. In the construction of motor vehicles, the method of mounting a unit upon a vehicle frame which comprises forming the side members of said vehicle frame with cut away portions, securing the unit to spaced longitudinally extending members designed and arranged to fit within the cut away portions of the side members of said vehicle frame, locating the assembly comprising said unit and said longitudinally extending members upon said vehicle frame with said longitudinally extending members filling in the cut away portions of said vehicle frame, and securing said assembly in place by welding the longitudinal members of said assembly to the side members of said vehicle frame.

4. The method of manufacturing a series of motor vehicles which comprises the production of series of units of different load and power characteristics composed of different parts of the propelling and driving mechanism, each embodying a pair of spaced longitudinal members, providing a series of vehicle frames of different lengths and load carrying capacities having their side rails spaced apart a distance substantially equal to the spacing of the longitudinal members of the said units and having their side rails formed with cut away portions conforming in size and shape to the longitudinal members of said units, assembling different combinations of said units with different frames or with frames of the same type with the longitudinal members of said units filling in the cut away portions of the side members of the vehicle frames, and securing the units in place by welding the longitudinal members of the units to the side rails of the vehicle frames.

KARL M. WISE.